United States Patent

Cooksey et al.

[11] Patent Number: 5,882,257
[45] Date of Patent: Mar. 16, 1999

[54] ROCK TRAP SUMP DOOR LATCH

[75] Inventors: William L. Cooksey, Geneseo; Vincent M. Moster, Moline, both of Ill.

[73] Assignee: Case Corporation, Racine, Wis.

[21] Appl. No.: 936,001

[22] Filed: Sep. 23, 1997

[51] Int. Cl.⁶ .......................... A01D 75/18; A01F 29/16
[52] U.S. Cl. .......................................................... 460/106
[58] Field of Search .................................. 460/106, 105, 460/119, 120, 150

[56] References Cited

U.S. PATENT DOCUMENTS

| | | |
|---|---|---|
| 3,664,348 | 5/1972 | Maiste et al. . |
| 3,771,530 | 11/1973 | Wassell . |
| 4,146,038 | 3/1979 | DeBusscher et al. . |
| 4,335,563 | 6/1982 | Rice et al. . |
| 4,335,564 | 6/1982 | Knepper . |
| 4,440,179 | 4/1984 | Bassett et al. . |
| 4,538,625 | 9/1985 | Fortune et al. ........................ 460/105 |
| 5,702,300 | 12/1997 | Wilson ................................... 460/106 |

OTHER PUBLICATIONS

2188 Series Axial Flow Combine, Operators Manual, 1996 Case Corporation, pp. 98–99.

*Primary Examiner*—Terry Lee Melius
*Attorney, Agent, or Firm*—Foley & Lardner

[57] ABSTRACT

A rock trap sump assembly includes a rock trap sump having an opening through which rocks may be ejected, a door pivotally supported adjacent to the opening, a latch arm pivotally coupled to the rock trap sump about a first axis and a link pivotally coupled to the door about a second axis and pivotally coupled to the latch arm about a third axis. The latch arm pivots about the first axis to move the door between a first closed position in which the door closes the opening and a second opened position in which the door pivots away from the opening.

18 Claims, 4 Drawing Sheets

ROCK TRAP SUMP DOOR LATCH

FIELD OF THE INVENTION

The present invention relates to rock trap sumps for use in combines and other harvesting equipment. In particular, the present invention relates to a rock trap sump latch which allows an operator to open, close and control the position of the door by simply rotating a handle in one direction or the other along a side of the rock trap sump.

BACKGROUND OF THE INVENTION

During the harvest of crops and forage, harvesting machines frequently pick up and ingest rocks and other foreign matter. The rocks and foreign matter ingested by the harvesting machine damage the crop handling mechanisms of the harvesting machine. As a result, many harvesting machines, such as combines, include devices for detecting and separating the rocks and foreign matter from the crops and forage. The separated rocks and foreign matter collect within a rock trap sump for later discharge and disposal.

Conventional rock trap sumps include a cavity or chamber for storing the separated rocks and foreign matter and a door for emptying the rocks and foreign matter from the chamber. The door is typically hinged adjacent to a rock trap sump opening and pivots to open and close the opening. During the collection of rocks and foreign matter within the chamber, a door latch independently supported adjacent and below the rock trap sump engages and supports the door in a closed position. To empty the chamber, the door latch is actuated to release the door, thereby permitting the door to fall open for the discharge of rocks and foreign matter.

Although simple in construction, conventional rock trap sump assemblies are time consuming and difficult to empty. Because the door and the handle of the latch are located low on the machine beneath the rock trap sump, the door is difficult to open and close. Moreover, because the handle merely controls the engagement and disengagement of the latch with the door, the operator has no control over the position of the door other than to physically grab the door and position the door by hand. Consequently, emptying the rock trap sump can be tedious and time consuming.

SUMMARY OF THE INVENTION

The present invention is directed to a rock trap sump assembly which includes a rock trap sump having an opening through which rocks may be ejected, a door pivotally supported adjacent to the opening, a latch arm pivotally coupled to the rock trap sump about a first axis and a link pivotally coupled to the door about a second axis and pivotally coupled to the latch arm about a third axis. The latch arm pivots about the first axis to move the door between a first closed position in which the door closes the opening and a second opened position in which the door pivots away from the opening.

In one preferred embodiment, the latch arm is S-shaped and projects away from a side of the rock trap sump. The door, latch arm and link are preferably configured so as to pivot to a center position in which the first, second and third axes are co-linear. The door, latch arm and link preferably pivot past the center position during movement of the door between the first closed position and the second opened position. Once the door is in the closed position, the link maintains the door in the closed position. As the door is moved into the second opened position, the link forces the door open during rotation of the latch arm. The link preferably has an adjustable length between the door and the latch arm.

DETAILED DESCRIPTION OF THE PREFERRED EMBODIMENTS

Figure 1:
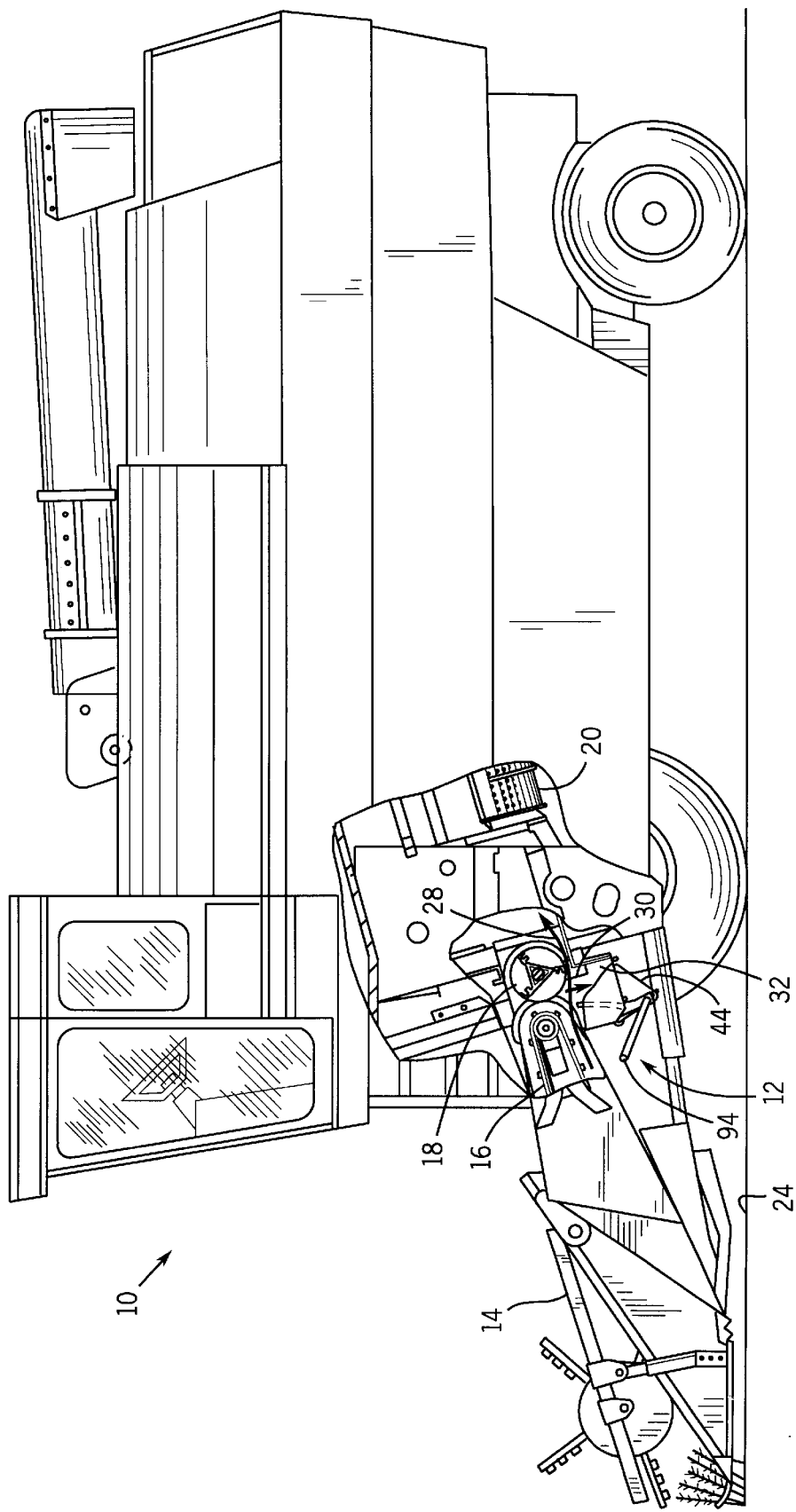
FIG. 1 is a side elevational view of a harvesting machine with portions broken away to illustrate an exemplary rock trap sump assembly.

FIG. 1 is a side elevational view of a harvesting machine 10 with portions broken away to illustrate rock trap sump assembly 12. Harvesting machine 10 preferably comprises a combine for harvesting various crops such as corn, wheat, soybeans and oats. Harvesting machine 10 generally includes header 14, feeder 16, feed beater 18 and threshing mechanism 20. Header 14 is conventionally known and is positioned at a front end of harvesting machine 10. Header 14 separates desired portions of crop 22 from the ground surface 24 and conveys the separated crop portions towards feeder 16. Although header 14 is illustrated as a grain header removably mounted to a front end of harvesting machine 10, header 14 may alternatively be fixedly connected to harvesting machine 10 and may comprise any one of a variety of wellknown headers and other crop severing mechanisms such as corn headers and the like.

Feeder 16 extends between header 14, feed beater 18 and threshing mechanism 20. Feeder 16 preferably comprises a conventionally known feeder chain which is driven in a conventionally known manner so as to engage and carry the separated crop portions from header 14 to feed beater 18 towards threshing mechanism 20.

Feed beater 18 is supported by harvesting machine 10 above rock trap sump assembly 12 between feeder 16 and threshing mechanism 20. Feed beater 18 receives the separated crop portions from feeder 16 and, upon being rotatably driven in a conventionally known manner, conveys the separated crop portions towards and into threshing mechanism 20 as indicated by arrow 28. As indicated by arrow 30, rocks and foreign matter, which are generally heavier and denser than the separated crop portions, are separated and downwardly discharged into interior 32 of rock trap sump assembly 12. Typically, the rotation of feed beater 18 propels the rocks and foreign matter downwardly through straw and chaff into interior 32 of rock trap sump assembly 12. As a result, the rocks and foreign matter are separated from the severed crop portions prior to reaching threshing mechanism 20 where the rocks and foreign matter could otherwise cause great damage to threshing mechanism 20 and other crop handling components of harvesting machine 10.

Rock trap sump assembly 12 receives and stores the separated rocks and foreign matter for later discharge and disposal. Rock trap sump assembly 12 is generally positioned low on harvesting machine 10 forward of threshing machine 20 and other crop handling mechanisms of harvesting machine 10. In the preferred embodiment illustrated, rock trap sump assembly 12 extends beneath and between feeder 16 and feed beater 18. Rocks collected in interior 32 of rock trap sump assembly 12 are discharged by opening door 44 with the rotation of handle 94. Handle 94 projects from one side of rock trap sump assembly 12 and feeder 16 of harvesting machine 10 to allow the operator to discharge rocks and foreign matter from rock trap sump assembly 12 from a more convenient position. Selective rotation of handle 94 enables the operator to open, close and control the position of door 44 as desired.

Figure 2:
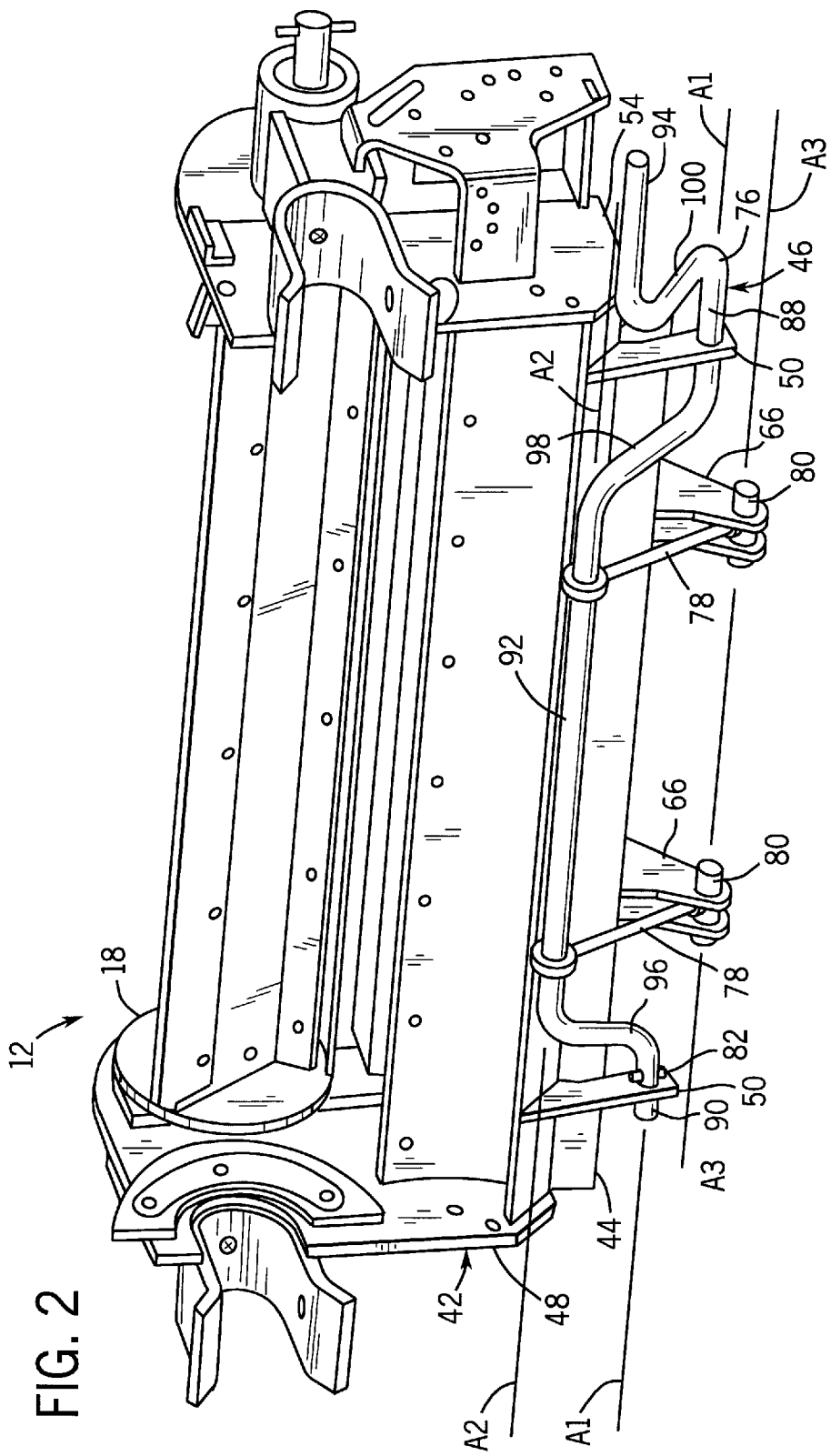
FIG. 2 is an enlarged perspective view of the exemplary rock trap sump assembly.
Figure 3:
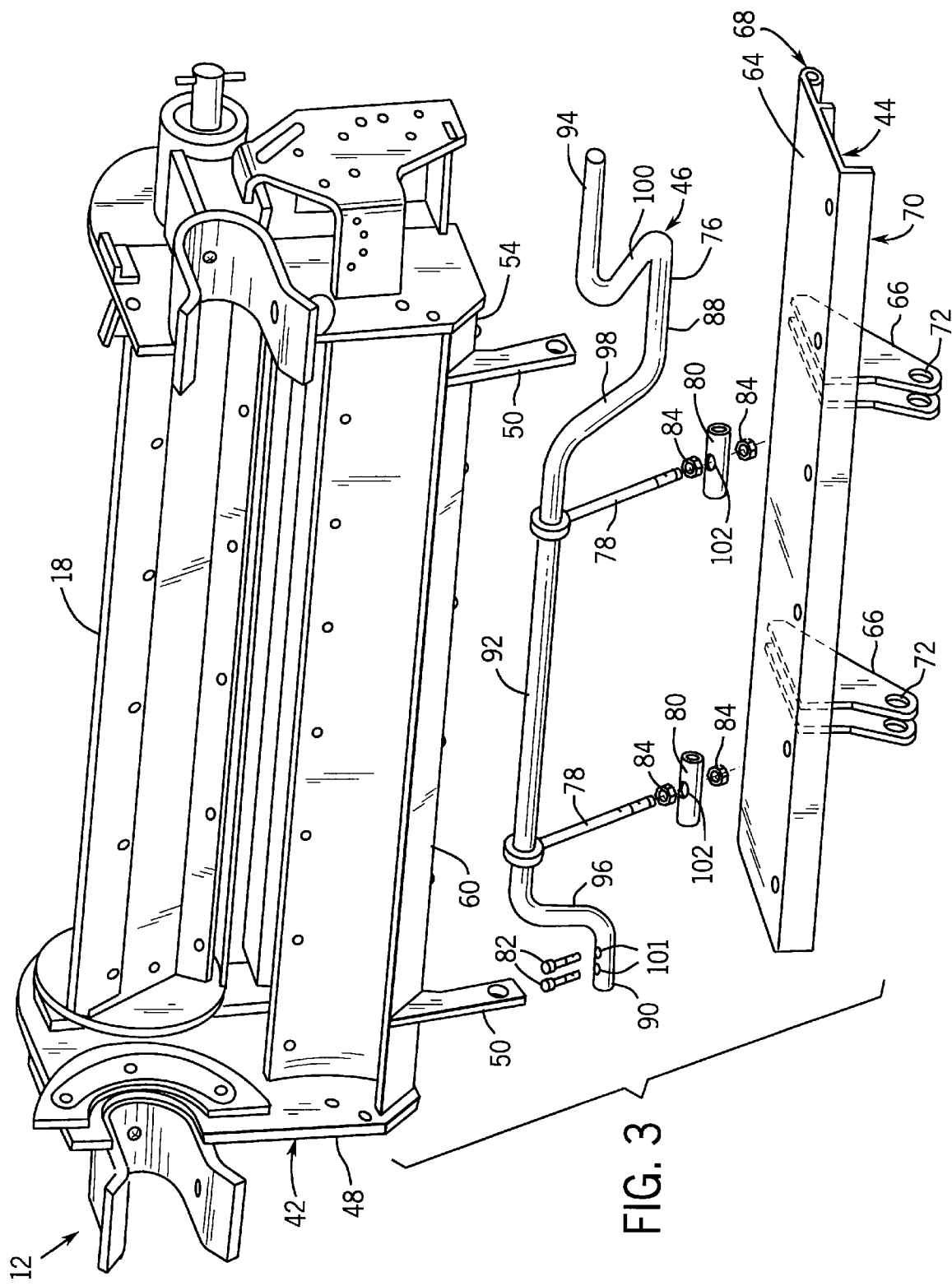
FIG. 3 is an exploded perspective view of the exemplary rock trap sump assembly.

FIGS. 2 and 3 illustrate a perspective view of rock trap sump assembly 12 in greater detail. FIG. 2 is a perspective view of rock trap sump assembly 12. FIG. 3 is an exploded perspective view of rock trap sump assembly 12. Rock trap sump assembly 12 generally includes rock trap housing 42, door 44 and latch mechanism 46. Housing 42 generally includes panels 48 and supports 50. Panels 48 comprise elongate generally flat panels which are secured to one another so as to form a receptacle or sump 54 for receiving rocks and other foreign matter picked up by harvesting machine 10. Sump 54 is positioned for receiving stones and other foreign matter from the harvesting machine. In the preferred embodiment illustrated, sump 54 is formed by panels 48 below a feed beater 18. During the harvesting of crops, rocks and foreign matter fall into sump 54 where they are retained until sump 54 is emptied through opening 60 defined by panels 48.

Latch supports 50 are generally elongate extensions projecting downwardly from panels 48. Supports 50 pivotally support latch mechanism 46 below opening 60.

Door 44 is pivotally coupled to rock trap housing 42 adjacent opening 60 and includes panel 64 and mounting brackets 66. Panel 64 is a generally flat panel shaped and sized so as to close opening 60 when pivoted adjacent opening 60. Panel 64 preferably includes a rear end 68 hinged to housing 42 and a front end 70 coupled to brackets 66. Panel 64 pivots about the hinge at rear end 68 between a first position in which panel 64 closes opening 60 and a second position in which panel 64 extends away from opening 60 for the discharge of rocks and foreign material from sump 54.

Mounting brackets 66 extend downwardly and forwardly from panel 64 and are configured for being pivotally mounted to latch mechanism 46. In the preferred embodiment illustrated, each latch mounting bracket 66 includes a pair of spaced triangular-shaped ears mounted to panel 64. The triangular-shaped ears of each mounting bracket 66 include a pair of spaced aligned apertures 72 which pivotally receive latch mechanism 46.

Latch mechanism 46 is coupled between housing 42 and door 44 so as to selectively pivot door 44 between the first closed position and the second opened position. Latch mechanism 46 includes latch arm 76, links 78, pivot tubes 80 and fasteners 82, 84. Latch arm 76 is coupled between latch supports 50 of housing 42 and links 78 and generally includes pivot portions 88, 90, link pivot portion 92, handle 94 and lever arm portions 96, 98 and 100. Pivot portions 88 and 90 pivotally couple latch mechanism 46 to supports 50. In the preferred embodiment illustrated, pivot portion 88 extends between lever arm portions 98 and 100 through one of supports 50. Pivot portion 90 extends from lever arm portion 96 coaxial with pivot portion 88. Pivot portion 90 extends through the other of supports 50 and defines two spaced bores 101, sized and positioned for receiving fasteners 82 on opposite sides of supports 50. Fasteners 82 preferably comprise cotter pins. Pivot portions 88 and 90 pivotally support handle 94 about axis A1.

Link pivot portion 92 extends between lever arm portions 96, 98 and pivot portions 88, 90. Link pivot portion 92 pivotally supports links 78 about an axis A2 spaced from axis A1. As a result, links 78 pivot about axis A2 while rotating about axis A3.

Handle 94 extends from the side of housing 42. As a result, the operator may open, close and control the position of door 44 from a much more convenient position along side of rock trap sump assembly 12.

Lever arm portions 96, 98 extend between pivot portions 88, 90 and link pivot portion 92. Preferably, lever arm portions 96, 98 extend perpendicularly to both housing pivot portions 88, 90 and link pivot portion 92. Lever arm portion 100 extends between housing pivot portion 88 and handle 94. Lever arm portion 100 spaces handle 94 from axis A1 such that rotation of handle 94 about axis A1 creates a larger torque for raising and lowering door 44. In the preferred embodiment illustrated, latch arm 76 comprises a single elongate S-shaped bar or rod. Alternatively, latch arm 76 may be formed from multiple sections and may have a variety of alternative shapes and configurations.

Links 78 are generally elongate members pivotally coupled to link pivot portion 92 about axis A1 and pivotally coupled to door 44 about a third axis A3. In the preferred embodiment illustrated, links 78 comprise elongate eye bolts encircling link pivot portion 92 at a first end and pivotally coupled to link brackets 66 of door 44 by pivot tubes 80 at a second end. Links 78 are preferably dimensioned and made of a material to allow links 78 to be placed in compression and tension during the opening and closing of door 44 by latch mechanism 46.

Although links 78 are illustrated as elongate eye bolts extending between axes A2 and A3, various other members capable of being placed in either tension or compression may be utilized. For example, links 78 may alternatively comprise elongate coil springs mounted between latch arm 76 and door 44 and between axes A2 and A3.

Pivot tubes 80 are generally elongate tubes or cylinders configured for being coupled to links 78 and for extending through bores 102 of mounting brackets 66. In the preferred embodiment illustrated, pivot tubes 80 each include a transverse bore 102 through which link 78 extends. Links 78 preferably include exterior threads upon which fasteners 84, preferably nuts, are threaded to axially secure pivot tubes 80 to links 78. Because pivot tubes 80 are axially mounted to links 78 by fasteners 84, the axial positions of tubes 80 along links 78 may be easily adjusted by threading fasteners 84 and pivot tubes 80 along the threaded portion of links 78. As a result, the axial length of links 78 extending between axis A1 and axis A3 may be easily adjusted to adjust the degree of compression or tension applied to links 78 during the opening and closing of door 44. As can be appreciated, transverse bores 102 of pivot tubes 80 may alternatively be threadably received upon links 78.

Figure 4:
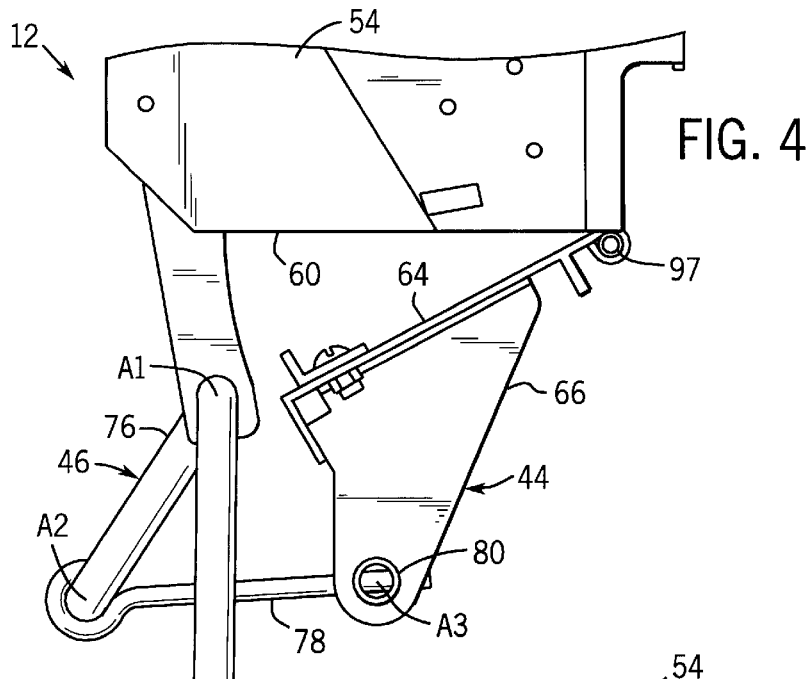
FIG. 4 is a fragmentary side elevational view of the exemplary rock trap sump assembly having a latch maintaining a door in an open position.
Figure 5:
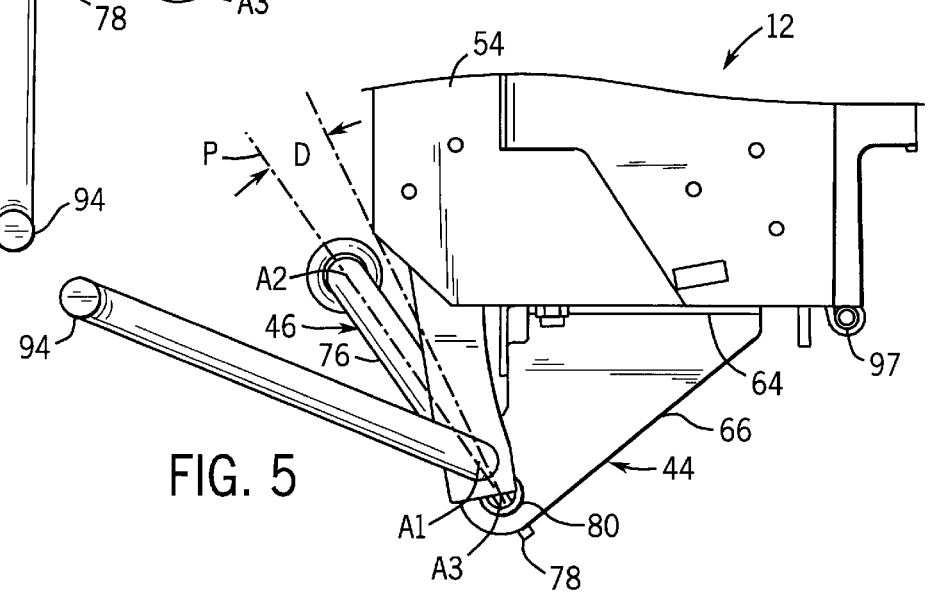
FIG. 5 is a fragmentary side elevational view of the rock trap sump assembly illustrating the latch at center and the door in a closed position.
Figure 6:
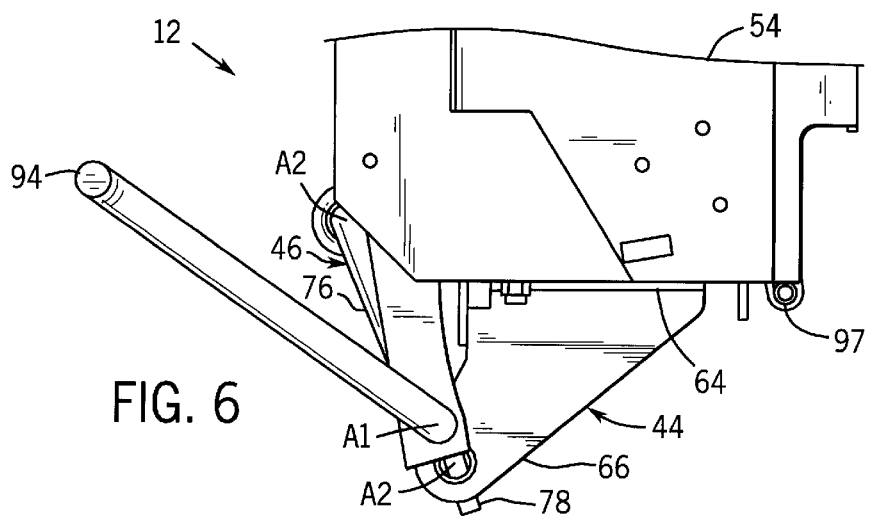
FIG. 6 is a fragmentary side elevational view of the rock trap sump assembly illustrating the latch in an over-center position and the door in the closed position.

FIGS. 4–6 illustrate latch mechanism 46 being actuated to pivot door 44 between an opened position (shown in FIG. 4) and a closed position (shown in FIG. 6). As best shown by FIG. 4, counterclockwise rotation of handle 94 pivots latch arm 76 in a counterclockwise direction about axis A1. As a result, links 78 rotate about axis A1 such that links 78 also pivot counterclockwise about axes A2 and A3. The rotation of links 78 about axis A1 compresses links 78 and pivot tubes 80 against latch mounting bracket 66 which pivots door 44 about its rear hinge 97 in a counterclockwise direction to an opened position for the discharge of rocks and other foreign matter from sump 54 through opening 60. During the opening of door 44 by the rotation of handle 94, the operator has complete control over the position of door 44. The further handle 94 is rotated, the more door 44 opens. Moreover, the maximum degree to which door 44 may be opened may be varied by adjusting fasteners 84 (shown in FIGS. 2 and 3) to adjust a length of links 78 extending between axes A2 and A3.

As best shown by FIG. 5, clockwise rotation of handle 94 pivots latch arm 76 clockwise about axis A1. As a result, links 78 also rotate clockwise about axis A1 pivoting clockwise about axes A2 and A3. As handle 94 is rotated clockwise, links 78 are placed in tension to pivot door 44 clockwise about its hinge 97 towards opening 60 and housing 42. Links 78 experience the largest amount of tension when axes A1, A2, and A3 are coplanar and "at center". As shown in FIG. 5, latch mechanism 46 is preferably configured such that panel 64 of door 44 compresses against housing 42 to close opening 60 when latch mechanism 46 is positioned in the at center position (i.e. when axes A1, A2, and A3 lie within plane P).

As shown by FIG. 6, continued clockwise rotation of handle 94 and latch arm 76 past the center position shortens the distance between axes A2 and A3 to lessen the amount of tension experienced by links 78. However, as further shown by FIG. 6, latch mechanism 46 is preferably configured such that panel 64 of door 44 remains compressed against housing 42 over opening 60 while latch arm 76 is rotated past the center position. Housing 42 engages latch arm 76 to prevent continued rotation of latch arm 76. In the preferred embodiment illustrated, latch arm 76 rotates a distance D, preferably about eleven degrees, past the at center position. Because continued rotation of latch arm 76 past the center position lessens the amount of tension experienced by links 78, latch arm 76 is naturally biased past the center position to lock and maintain door 44 in the closed position over opening 60 until latch arm 76 is manually rotated by handle 94.

Overall, rock trap sump assembly 12 provides an operator greater control and more convenience in emptying rocks and other foreign matter from sump 54. Because latch mechanism 46 and latch arm 76 are continuously coupled to door 44 via links 78 and pivot tubes 80, the operator has continuous control over the position of door 44. In addition, the maximum extent to which door 44 may be opened may be varied by adjusting the length of links 78. Because latch mechanism 46 maintains door 44 in the closed position, once rotated past the center position, the operator can open and close door 44 by mere rotation of handle 94. Because handle 94 extends or projects from a side of housing 42, rather than beneath housing 42, the operator may open, close and even control the position of door 44 from a more convenient position along side of rock trap sump 12 and harvesting machine 10.

Although rock trap sump assembly 12 has been illustrated as part of a harvesting machine for collecting rocks and foreign matter during the harvest of crops such as corn, wheat, soybeans and the like, rock trap sump assembly 12 may alternatively be reconfigured for being incorporated in other harvesting machines which harvest other types of crops and forage. For example, rock trap sump assembly 12 may alternatively be reconfigured for incorporation in choppers, cotton pickers, and forage harvesting equipment. Rock trap sump assembly 12 may also be reconfigured for use with harvesting machines having a variety of alternative rock detection and separation mechanisms.

Although the present invention has been described with reference to preferred embodiments, workers skilled in the art will recognize that changes may be made in form and detail without departing from the spirit and scope of the invention.

We claim:

1. A rock trap sump assembly comprising:
   a rock trap sump having an opening through which rocks may be ejected;
   a door pivotally coupled adjacent to the opening, wherein the door pivots between a first closed position in which the door closes the opening and a second open position in which the door pivots away from the opening;
   a latch arm pivotally coupled to the rock trap sump about a first axis;
   a link pivotally coupled to the door about a second axis and pivotally coupled to the latch arm about a third axis such that pivoting the latch arm about the first axis moves the door between the first closed and the second open position.

2. The assembly of claim 1 wherein the latch arm projects away from a side of the rock trap sump.

3. The assembly of claim 1 where the latch arm is S-shaped.

4. The assembly of claim 1 wherein the door, the latch arm and the link pivot to a center position in which the first, second and third axes are co-linear.

5. The assembly of claim 4 wherein the door, the latch arm and the link pivot past the center position during movement of the door between the first open position and the second closed position.

6. The assembly of claim 1 wherein the link maintains the door in the first closed position.

7. The assembly of claim 1 wherein the link forces the door open during rotation of the latch arm.

8. The assembly of claim 1 where the link has an adjustable length between the door and the latch arm.

9. A harvesting machine for harvesting crops, the harvesting machine comprising:
   a crop severing mechanism supported by the harvesting machine proximate the ground;
   a threshing mechanism supported by the harvesting machine; and
   a rock trap sump assembly supported by the harvesting machine between the crop severing mechanism and the threshing mechanism, the rock trap sump assembly including:
      a rock trap sump having an opening through which rocks may be ejected;
      a door pivotally coupled adjacent to the opening, wherein the door pivots between a first closed position in which the door closes the opening and a second open position in which the door pivots away from the opening;
      a latch arm pivotally coupled to the rock trap sump about a first axis;
      a link pivotally coupled to the door about a second axis and pivotally coupled to the latch arm about a third axis such that pivoting the latch arm about the first axis moves the door between the first closed and the second open position.

10. The harvesting machine of claim 9 wherein the latch arm projects away from a side of the rock trap sump.

11. The harvesting machine of claim 9 where the latch arm is S-shaped.

12. The harvesting machine of claim 9 wherein the door, the latch arm and the link pivot to a center position in which the first, second and third axes are co-linear.

13. The harvesting machine of claim 12 wherein the door, the latch arm and the link pivot past the center position during movement of the door between the first open position and the second closed position.

14. The harvesting machine of claim 9 wherein the link maintains the door in the first closed position.

15. The harvesting machine of claim 9 wherein the link forces the door open during rotation of the latch arm.

16. The harvesting machine of claim 9 where the link has an adjustable length between the door and the latch arm.

17. The harvesting machine of claim 9 wherein the crop severing mechanism comprises a crop header.

18. The harvesting machine of claim 9 including:
a conveying mechanism supported by the harvesting machine between the crop severing mechanism and the threshing mechanism, wherein the rock trap sump assembly is supported by the harvesting machine below the conveying mechanism.

* * * * *